(12) United States Patent
Garbar et al.

(10) Patent No.: US 7,544,229 B2
(45) Date of Patent: Jun. 9, 2009

(54) METHOD FOR THE PRODUCTION OF HIGHLY PURE METALLIC NANO-POWDERS

(75) Inventors: Arkady Garbar, Yoqneam Illit (IL); Fernando De La Vega, Zichron Yacov (IL); Einat Matzner, Adi (IL)

(73) Assignee: Cima NanoTech Israel Ltd., Caesarea (IL)

( * ) Notice: Subject to any disclaimer, the term of this patent is extended or adjusted under 35 U.S.C. 154(b) by 387 days.

(21) Appl. No.: 10/518,227

(22) PCT Filed: Jun. 19, 2003

(86) PCT No.: PCT/IL03/00522

§ 371 (c)(1),
(2), (4) Date: Oct. 17, 2005

(87) PCT Pub. No.: WO04/000491

PCT Pub. Date: Dec. 31, 2003

(65) Prior Publication Data

US 2006/0112785 A1 Jun. 1, 2006

(30) Foreign Application Priority Data

Jun. 19, 2002 (IL) ..................... 150325

(51) Int. Cl.
*B22F 9/16* (2006.01)
*B22F 9/20* (2006.01)
(52) U.S. Cl. ............... 75/343; 75/330; 75/351; 75/363; 75/370; 75/753; 252/500
(58) Field of Classification Search .......... 252/500; 241/3; 75/330, 343, 351, 363, 370, 753
See application file for complete search history.

(56) References Cited

U.S. PATENT DOCUMENTS

| | | | | |
|---|---|---|---|---|
| 4,668,355 | A * | 5/1987 | Lin ............ | 205/216 |
| 5,476,535 | A * | 12/1995 | Khasin .......... | 75/345 |
| 6,012,658 | A * | 1/2000 | Khasin et al. ........ | 241/5 |
| 6,054,495 | A | 4/2000 | Markowitz et al. | |
| 6,277,895 | B1 | 8/2001 | Li Guohui et al. | |
| 6,312,643 | B1 | 11/2001 | Upadhya et al. | |
| 2004/0262435 | A1 * | 12/2004 | Yadav et al. ........ | 241/1 |

FOREIGN PATENT DOCUMENTS

| EP | 0214644 A | 3/1987 |
|---|---|---|
| EP | 0761348 A | 3/1997 |

OTHER PUBLICATIONS

Carotenuto et al. "Preparation and characterization of nano-sized Ag/PVP composites for optical applications." European Phys. Journal B, 16, pp. 11-17, 2000.*

* cited by examiner

*Primary Examiner*—Douglas Mc Ginty
*Assistant Examiner*—Tri V Nguyen
(74) *Attorney, Agent, or Firm*—Fish & Richardson P.C.

(57) ABSTRACT

The present invention discloses a novel method for the production of metallic nano-powder. This cost-effective, simple process is customized for a full-scale production of metallic nano-powders containing a first metal, and comprising the following of forming an alloy comprising said first metal and at least one soluble metal; applying first thermal treatment in the manner homogenized alloy is obtained; applying a cold work to the homogenized alloy so thin strips are obtained; applying a second thermal treatment to the alloy until a phase composition of predetermined characteristics is obtained; subjecting the said alloy to a leaching agent adapted to effectively leach out the least one soluble metal; filtering and washing the powder; washing the powder; drying the powder; coating the powder with chemicals; and then de-agglomerating the coated powder. The present invention also discloses a cost-effective and highly pure metallic powder produced by the method defined above.

18 Claims, No Drawings

METHOD FOR THE PRODUCTION OF HIGHLY PURE METALLIC NANO-POWDERS

RELATED APPLICATIONS

This application is a U.S. National Application which claims priority to International application Serial No. PCT/IL2003/000522, which was filed on Jun. 19, 2003and claims priority to Israel Patent Application No. 150325, which was filed on Jun. 19, 2002. The disclosure of prior applications is considered part of (and is incorporated by reference in) the disclosure of this application.

FIELD OF THE INVENTION

The present invention generally relates to a method for the production of highly pure metallic nano-powders and to powders produced thereof. More specifically, the present invention relates to metallic silver, metal elements, copper, platinum, nickel, palladium, titanium, gold, cobalt and blends comprising such metals (alloys) nano-powders wherein the particle size is in the range of 1 to 100 nm.

BACKGROUND OF THE INVENTION

Nano-powders are single or multi-phase polycrystals comprises particles with sizes of 1 to 100 nm in at least one direction. Various methods were suggested in the literature for the production of well-defined nano-powders. Some of them, such as presented in U.S. Pat. No. 6,312,643 to Upadhya et al. are respectively tedious and costly operation, comprises no less then 21 steps, treating the material in all solid, liquid and gas phases; wherein gas is evacuated from one processing chamber to less then $10^{-3}$ Torr, and then pressed in another processing chamber to at least $10^3$ psi, heated to some 550° C. etc.

U.S. Pat. No. 6,054,495 to Markowitz et al. presents a powder of un-agglomerated metallic particles, made by making at least four dispersions of surfactants vesicles in the presence of metal ions, and then freeze-drying the obtained lipid phase. This costly method requires the operator to continuously control this very delicate, inflammable, multi-phase and complicated system, decreasing its compatibility with full-scale operations.

U.S. Pat. 5,476,535 to the applicant present a method for the production of nano-powders, especially of silver. This process comprising the steps of (a) forming an aluminum-silver alloy of a specific blend composition; (b) leaching the aluminum ingredient by a series of consequent leaching steps wherein a fresh leaching agent is reacting the treated solid material, providing a gradually porous and homogeneous silver alloy. Ultrasonic oscillations are applied in step (c), disintegrating the agglomerate and enhancing the penetration of the leaching agent into the ever growing porous of the alloy by the application of a plurality of ultrasonic oscillations. The leaching agent is leaving silver agglomerate in step (d), and then the agglomerate is washed and dried in a final step.

According to U.S. Pat. No. 6,012,658 to the applicant, the very same process was used as is to form metal flasks. Thus, the following two main steps were introduced: comminuting the alloys obtained by the aforementioned U.S. Pat. No. 5,476,535 into defined particles, and then faltering the obtained particles into strip-like highly porous alloys of pre-determined characteristics.

Thus, there exists a need for cost-effective, simple process customizable for full-scale production of metallic nano-powders and to the valuable products produced thereof.

SUMMARY OF THE INVENTION

It thus the object of the present invention to provide a useful and novel method for the production of metallic nano-powders, comprising the steps: (a) forming an alloy comprising a first metal or metal, preferably silver, copper, platinum, palladium, titanium, nickel, gold, cobalt and blends comprising such metals (alloys), yet not limited to said metals, and at least one another second soluble metal or metals, preferably, yet not limited to aluminum, magnesium, zinc or tin. (b) applying first thermal treatment in the manner homogenized alloy is obtained; (c) applying a cold work to the homogenized alloy so thin strips are obtained; (d) applying a second thermal treatment to the said alloy until a phase composition of predetermined characteristics is obtained; (e) subjecting the said alloy to a leaching agent adapted to effectively leach out the least one soluble metal; (f) filtering and washing the powder; (g) drying the powder; (h) coating the powder with chemicals; and lastly, (i) de-agglomerating the coated powder.

This method is based on gradually single leaching step and plurality of few thermal treatings, avoid using ulrasonic processes, and comprising a novel technique of coating the powder with predetermined chemicals which provides the obtained powder better de-agglomeration properties and de-agglomeration process.

It is another object of the present invention to provide pure metallic powder having particle size of nano scale, produced in the method defined above. More specifically, the aim of the present invention is to introduce a nano-powder comprising about 99.0%-99.6% desired metal and less then 1% soluble metal, having a specific area of about 6 to 25 $m^2$ per gram and characterized by an average particle size of about 50 to 100 nm.

DETAILED DESCRIPTION OF THE INVENTION

It is thus in the scope of the present invention to present a useful method for the production of metallic nano-powder of a first metal. Said method if essentially comprising the following at least nine steps:

i. forming an alloy comprising a first metal and at least one another second soluble metal;
ii. applying first thermal treatment in the manner homogenized alloy is obtained;
iii. applying a cold work to the homogenized alloy so thin strips are obtained;
iv. applying a second thermal treatment to the said alloy until a phase composition of predetermined characteristics is obtained;
v. subjecting the said alloy to a leaching agent adapted to effectively leach out the least one soluble metal;
vi. filtering and washing the powder;
vii. drying the powder;
viii. coating the powder with chemicals; and lastly,
ix. de-agglomerating the coated powder.

It is acknowledged that while the present invention has been described with the respect to a plurality of few preferred examples, it will be appropriated that many variations, modifications and applications of the invention may be made.

It is hence in the general scope of the present invention, wherein the first metal is selected from atoms of group I, IV, V, VI, VII and VIII of the periodic table of elements. More specifically, said first metal is selected from, copper, nickel, cobalt, titanium, silver, palladium, platinum, gold and iridium. Most particularly, silver is said first metal. In addition, various alloys comprising a blend of the said silver and at least one other metal, selected from atoms of group I, IV, V, VI, VII and VIII of the periodic table of elements. More specifically, cooper, aluminum, nickel, cobalt, titanium, palladium, platinum, gold, iridium or—any mixture thereof is suitable to be comprised in the aforementioned alloy.

In addition, it is also in the scope of the invention, wherein the at least one soluble metal is selected from aluminum, zinc, magnesium, tin, copper and silver. In one embodiment of the present invention is wherein the concentration of the at least one soluble metal is near saturation. Most specifically, the present invention relates thus to a method to produce a nano-powder, wherein silver is the first metal and aluminum is the soluble metal.

It is acknowledged that the preferred concentration of the soluble metal ingredient of the said processed alloy is in the range between 5 to 90% w/w.

As said above, the method according to the present invention comprises at least one step of leaching. Suitable leaching agents are preferably selected from sodium hydroxide, potassium hydroxide, acetic acid, hydrochloric acid, formic acid, sulfuric acid, hydrofluoric acid, nitric acid or any combination thereof. It is acknowledged that a sequent of few leaching steps useful to extract the soluble metal from the alloy, wherein in each leaching step comprising different leaching agent at possibly different concentration.

The hereto-defined method may additionally comprise at least one step of surface cleansing wherein the obtained strips are treated by means of at least one cleaning agent. Those cleansing agents are preferably selected from nitric acid, potassium hydroxide, sodium hydroxide or a mixture thereof.

According to the present invention, the term 'heat treatment' is defined as any heating, cooling, smelting, fusing or melting, amalgamating, liquidating, sustaining a substrate in a predetermined temperature and for a predetermined period or any combination thereof. It is thus in the scope of the present invention, wherein the temperature ranges of first thermal treatment is about 400° C. for 2 to 4 hours, or alternatively, until a homogenized alloy is obtained. Similarly, According to the present invention, the term 'cold work' is defined as any work or force provided on the substrate. This work is selected, yet not limited to pressing, compressing, squashing, mashing, pulverizing, grinding, milling or any combination thereof. Thus, the aforementioned method comprises a step of cold work as defined above, useful for applying the obtained strip a thickness in the range of 0.3 to 1.0 mm or thinner.

In one specific embodiment of the present invention, especially adapted to the family of silver-aluminum alloys, the above mentioned second thermal treatment is adapted to the range of 460° C. to 610° C. Said method according to the present invention may additionally comprising a step of quenching steps, wherein the strips obtained from the oven are to be treated by means of immersing them in cold water, so the predetermined phase composition obtained during the heat treatment is provided.

According to the present invention, sodium hydroxide is a useful leaching agent, adapted to be effective wherein the leaching temperature is between 36° C. to 80° C.

In one specific embodiment of the present invention, silver is the first metal and aluminum is the soluble metal. Here, the concentration of the aforementioned sodium hydroxide is between 25 to 55% (w/w) and the molar ratio of the aluminum to the said sodium hydroxide is between 5 to 6.

The obtained powder is preferably to be filtered and washed by water so pH in the range of 6 to 7 is provided and further wherein at a maximum temperature of 45° C., the powder to a LOD weight ratio is lower 1%.

The present invention relates to various chemical compositions, some of them are wieldy known in the art in their trademark name. Those terms are denoted in the present invention according their definitions introduced in Table 1 below:

TABLE 1

The trade name and the chemical name of chemicals utilized in the present invention.

| Trade name | Chemical name |
| --- | --- |
| Arlacel 60 | sorbitan sesquioleate |
| Arlacel 83 | sorbitan sesquioleate |
| Brig 30 | polyoxyethylene lauryl ester |
| Brij 35 | Polyoxylene lauryl ester |
| Cetyl alcohol | Hexadecanol |
| Diethylene glycol | monolaurate |
| Glyceryl monostearate | glyceryl monostearate |
| Lauroglycol | propylene glycol monostearate |
| Methocel | Methylcellulose |
| Myrj 45 | Polyoxyethylene monostearate |
| Myrj 49 | Polyoxyethylene monostearate |
| Myrj 52 | polyoxyl 40 stearate |
| PEG 400 | polyoxyethylene monolaurate |
| PEG 400 monoleate | polyoxyethylene monooleate |
| PEG 400 monostearate | polyoxyethylene monostearate |
| Pluronic F-68 | gelatin |
| Potassium oleate | poloxamer |
| Span 20 | Sorbitan monolaurate |
| Span 40 | sorbitan monopalmitate |
| Span 60 | sorbitan monostearate |
| Span 65 | sorbitan tristearate |
| Span 80 | Sorbitan mono-oleate |
| Span 85 | Sorbitan trioleate |
| Tween 20 | Polyoxyethylene sorbitan monolaurate |
| Tween 21 | polyoxyethylene sorbitan monolaurate |
| Tween 40 | polyoxyethylene sorbitan monopalmitate |
| Tween 60 | polyoxyethylene sorbitan monostearate |
| Tween 61 | polyoxyethylene sorbitan monostearate |
| Tween 65 | Polyoxyethylene sorbitan tristearate |
| Tween 80 | Polyoxyethylene sorbitan mono-oleate |
| Tween 81 | polyoxyethylene sorbitan monooleate |
| Tween 85 | Polyoxyethylene sorbitan trioleate |
| sorbic acid | 2,4 hexadienoic acid |
| TOPO | trioctylphosphine oxide |
| TOP | trioctylphosphine |
| T1124 | Ammonium salt of poly carboxylic acid |

It was stressed above that various chemicals are useful for coating the powder. According to the present invention, chemicals hereby defined, yet not limited to this list, are selected from sorbitan esters, polyoxyethylene esters, alcohols, glycerin, polyglycols, organic acids salts and esters, thiols, phosphines, acrylics and polyesters or any other suitable low molecular weight polymers or combination thereof were found to comprise superior effectively.

Moreover, it is hereby acknowledged that chemicals for coating the powder are admixed to the range of 1 to 5%, weight-by-weight based on the metal. Alternatively, least two different chemicals are to be used for coating the powder. In this case, at least one primary chemical is admixed in the range 1% to 5%, and at least one secondary chemical is admixed in the range of 0.1 to 2.5% weight by weight based on the metal. Table 2 presents an extracted list of useful combinations of both primary and secondary chemicals.

TABLE 2

Various combinations of both primary and secondary chemicals useful for coating the powder:

| Primary Chemical | Secondary Chemical |
| --- | --- |
| Tween 80 | Oleic Acid |
| Span 20 | Tween 20 |
| Span 60 | Hexadecanol |
| Span 65 | Tween 20 |
| Span 80 | Hexadecanol |
| Span 80 | cetyl alcohol |
| Span 20 | Oleic Acid |
| Span 20 | Octanol |
| Span 60 | Glycerin |
| Span 60 | Propylene Glyecol |
| Span 65 | Tween 20 |
| Span 20 | Hexadecanol |
| Glycerin Mono | Glycerine |
| Span 60 | Glycerine |
| poloxyethylene (23) | Span 60 |
| poloxyethylene (4) | Span 60 |
| Palmitic Acid | Glycerin |

It also in the scope of the present invention wherein the method for the production of the said metallic nano-powers additionally comprises the following steps:
a. dissolving the chemicals in a solvent;
b. admixing the dissolved chemicals with the metal powder by an efficient mean; and then,
c. drying the slurry in an oven at low temperature.

The above-mentioned solvent is preferably selected from of low boiling temperature solvent, and more specifically from methanol, ethanol, isopropanol, acetone, water or combination thereof. It is also suggested according to use a ball mill to admixed the dissolved chemicals with the metal powder.

It is also in the scope of the present invention, wherein the said de-agglomeration of the said coated powder is enabled by means of a dry process, using at least one jet mill. Additionally or alternatively, said de-agglomerating of the coated powder is also enabled by means of a wet process, using effective means selected from of any suitable mechanical dispersers, mechanical homogenizes, ultra sonic homogenizes or any combination thereof. In this respect, means selected from, yet not limited to rotor/stator; rotors; dispersing elements; mechanical homogenizers; ultra-sonic homogenizers; ball milling and/or any other suitable de-agglomeration means are acknowledged as useful.

It is well in the scope of the present invention to provide a metallic nano-powder produced by the method as defined above. In general, said metal is selected from the group I, IV, V, VI, VII and VIII of the periodic table of elements. More specifically, the said metal powder is selected from silver, cooper, nickel, cobalt, titanium, silver, palladium, platinum, gold and iridium. In addition, said produced nano-powder comprises metal that is preferably selected from alloys comprising a blend of silver and at least one other metal, selected from atoms of group I, IV, V, VI, VII and VIII of the periodic table of elements.

EXPERIMENTAL

A metallic nano-powder comprising silver, silver-cooper, silver palladium, silver-platinum, and cooper was produced by the method of forming an alloy comprising said first metal and at least one soluble metal, selected from aluminum, zinc and magnesium, applying first thermal treatment in the manner homogenized alloy is obtained; applying a cold work to the homogenized alloy so thin strips are obtained; applying a second thermal treatment to the previously leached alloy until a phase composition of predetermined characteristics is obtained; subjecting the said alloy to a leaching agent (i.e., sodium hydroxide, hydrochloride, formic acid and sulfuric acid) adapted to effectively leach out the least one soluble metal; filtering and washing the powder; drying the powder; coating the powder with chemicals; and then, de-agglomerating the coated powder by various means (e.g., using the commercial available Kinematica or jet mills):

TABLE 3

Nine different experiments of producing metallic nano-powders by means of the present invention.

| | | Powder | | | | First Leaching | | | |
| --- | --- | --- | --- | --- | --- | --- | --- | --- | --- |
| Exp. No. | Metal Alloy | Main metal Quantity | Second metal Quantity | Auxiliary Metal | Quantity | Leaching Chemical | Chemical Quantity | Water Quantity | Solution Volume |
| 1 | Ag | 3,000 | 0 | Al | 7,000 | NaOH | 48 KG | 144 L | 150 L |
| 2 | Ag/Cu | 2,925 | 75 | Al | 12,000 | NaOH | 48 KG | 144 L | 150 L |
| 3 | Ag/Cu | 2,925 | 75 | Al | 12,000 | NaOH | 48 KG | 144 L | 150 L |
| 4 | Ag/Pd | 2,940 | 60 | Al | 12,000 | NaOH | 48 KG | 144 L | 150 L |
| 5 | Ag/Pt | 2,940 | 60 | Al | 12,000 | NaOH | 48 KG | 144 L | 150 L |
| 6 | Cu | 620 | 0 | Al | 2,560 | NaOH | 34 KG | 100 L | 104 L |
| 7 | Cu | 50 | 0 | Zn | 150 | HCl | 2 Kg HCl 32% | 2 L | 4 L |
| 8 | Cu | 50 | 0 | Mg | 150 | Formic acid | 2.8 Kg F.A. 85% | 3.2 L | 6 L |
| 9 | Cu | 100 | 0 | Mg | 150 | H2SO4 | 1.2 Kg H2SO4 | 4.8 L | 6 Kg |

TABLE 3-continued

Nine different experiments of producing metallic nano-powders by means of the present invention.

| | Second Leaching | | | Powder | Deagglomeration Process | |
|---|---|---|---|---|---|---|
| Exp. No. | Leaching Chemical | Chemical Quantity | Water Quantity | Solution Volume | Quantity after leaching | Chemicals (coating) | Technique |
| 1 | NaOH | 1.6 KG | 3.4 L | 6.4 L | 2880 | see table 4 | JM |
| 2 | NaOH | 1.6 KG | 3.4 L | 6.4 L | 2880 | see table 4 | JM |
| 3 | NaOH | 1.6 KG | 3.4 L | 6.4 L | 2880 | see table 4 | Kinematica |
| 4 | NaOH | 1.6 KG | 3.4 L | 6.4 L | 2880 | see table 4 | JM |
| 5 | NaOH | 1.6 KG | 3.4 L | 6.4 L | 2880 | see table 4 | JM |
| 6 | HCl | 3 Kg HCl 32% | 3.0 L | 6.0 L | 610 | see table 4 | JM |
| 7 | HCl | 0.5 Kg HCl 32% | 0.5 L | 1 L | 49 | see table 4 | JM |
| 8 | HCl | 0.5 Kg HCl 32% | 0.5 L | 1 L | 49 | see table 4 | JM |
| 9 | HCl | 1 Kg HCl 32% | 1 L | 2 L | 98 | see table 4 | Kinematica |

TABLE 4

Nine different coating systems to produce nano-metal particles according to this invention.

| | | De-agglomeration Process | | Total |
|---|---|---|---|---|
| Experiment | Metal Alloy | Chemicals (coating) Quantities per 1 kg powder | Technique | Powder yield, % |
| 1 | Ag | 156 g Span 80; 144 g Cetyl Alcohol | JM | 85 |
| 2 | Ag/Cu | 120 g Span 20; 180 g Oleic acid | JM | 85 |
| 3 | Ag/Cu | 300 g Tween 80 | Kinematica | 90 |
| 4 | Ag/Pd | 300 g Span 60 | JM | 85 |
| 5 | Ag/Pt | 150 g Palmitic acid; 150 g Glycerine | JM | 85 |
| 6 | Cu | 300 g Byk 140 | JM | 90 |
| 7 | Cu | 200 g Span 20; 100 g cetyl alcohol | JM | 90 |
| 8 | Cu | 300 g Trioctylphosphine Oxide | JM | 90 |
| 9 | Cu | 300 g Octanethiol | Kinematica | 92 |

The invention claimed is:

1. A method for producing a metal nano-powder comprising:
   (a) forming an alloy comprising a first metal and a second metal that is different from the first metal;
   (b) subjecting the alloy to a leaching agent effective to leach out the second metal and form a metal nano-powder;
   (c) washing and filtering the metal nano-powder;
   (d) drying the washed and filtered metal nano-powder;
   (e) coating the dried metal nano-powder with a chemical reagent to form a coated metal nano-powder wherein the chemical reagent is selected from the group consisting of sorbitan esters, polyoxyethylene esters, alcohols, glycerin, polyglycols, organic acid, organic acid salts, organic acid esters, thiols, phosphines, low molecular weight polymers, and combinations thereof; and
   (f) de-agglomerating the coated metal nano-powder.

2. A method according to claim 1 further comprising thermally treating the alloy prior to leaching.

3. A method according to claim 2 comprising thermally treating the alloy at a temperature between 460 and 610° C.

4. A method according to claim 1 further comprising cold working the alloy to create thin strips comprising the alloy prior to leaching.

5. A method according to claim 4 further comprising thermally treating the alloy prior to cold working.

6. A method according to claim 5 comprising thermally treating the alloy at a temperature of about 400° C.

7. A method according to claim 1 further comprising de-agglomerating the coated metal nano-powder using a jet mill.

8. A method according to claim 1 further comprising de-agglomerating the coated metal nano-powder using a mechanical disperser, a mechanical homogenizer, an ultrasonic homogenizer, or combination thereof.

9. A method according to claim 1 wherein the first metal is selected from the group consisting of silver, copper, nickel, cobalt, titanium, palladium, platinum, gold, iridium, and combinations thereof.

10. A method according to claim 1 wherein the second metal is selected from the group consisting of aluminum, zinc, magnesium, tin, copper, and silver.

11. A method according to claim 1 wherein the leaching agent is selected from the group consisting of sodium hydroxide, potassium hydroxide, and combinations thereof.

12. A method according to claim 1 wherein the leaching agent is selected from the group consisting of acetic acid, hydrochloric acid, formic acid, sulfuric acid, nitric, acid, hydrofluoric acid, and combinations thereof.

13. A method according to claim 1 wherein the metal nano-powder comprises an alloy.

14. A method according to claim 10 wherein the metal nano-powder comprises an alloy of silver and at least one other metal element selected from Group I, Group IV, Group V, Group VI, Group VII, and Group VIII of the Periodic Table of Elements.

15. A method according to claim 1 comprising coating the metal nano-powder with at least two different chemical reagents.

16. A method for producing a metal nano-powder comprising:
   (a) forming an alloy comprising a first metal and a second metal that is different from the first metal;
   (b) subjecting the alloy to a first thermal treatment to form a thermally treated alloy;
   (c) cold working the thermally treated alloy to form thin strips comprising the alloy;

(d) subjecting the thin strips to a second thermal treatment to form thermally treated thin strips comprising the alloy;

(e) subjecting the thermally treated thin strips to a leaching agent effective to leach out the second metal to form a metal nano-powder;

(f) washing, filtering, and then drying the metal nano-powder;

(g) coating the dried metal nano-powder with a chemical reagent to form a coated metal nano-powder wherein the chemical reagent is selected from the group consisting of sorbitan esters, polyoxyethylene esters, alcohols, glycerin, polyglycols, organic acid, organic acid salts, organic acid esters, thiols, phosphines, low molecular weight polymers, and combinations thereof; and (h) de-agglomerating the coated metal nano-powder.

17. A method for producing a metal nano-powder comprising:

(a) forming an alloy comprising a first metal and a second metal that is different from the first metal;

(b) subjecting the alloy to a leaching agent effective to leach out the second metal and form a metal nano-powder;

(c) washing and filtering the metal nano-powder;

(d) drying the washed and filtered metal nano-powder;

(e) coating the dried metal nano-powder with 1-5 wt. %, based upon the weight of the metal nano-powder, of a chemical reagent to form a coated metal nano-powder, wherein the chemical reagent is selected from the group consisting of sorbitan esters, polyoxyethylene esters, alcohols, glycerin, polyglycols, organic acid, organic acid salts, organic acid esters, thiols, phosphines, low molecular weight polymers, and combinations thereof; and (f) de-agglomerating the coated metal nano-powder.

18. A method according to claim 17 comprising coating the metal nano-powder with (a) 1-5 wt. %, based upon the weight of the metal nano-powder, of a primary chemical reagent and (b) 0.1-2.5 wt. %, based upon the weight of the metal nano-powder, of a secondary chemical reagent to form the coated metal nano-powder.

* * * * *